Patented Sept. 13, 1949

2,481,557

UNITED STATES PATENT OFFICE 2,481,557

SEPARATION OF ACONITIC ACID FROM MOLASSES

Joseph A. Ambler and Earl J. Roberts, New Orleans, La., assignors to the United States of America as represented by the Secretary of Agriculture No Drawing. Application February 4, 1947, Serial No. 726,448

2 Claims. (Cl. 260—527)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process of separating aconitic acid in the form of salts thereof from aqueous liquids containing free and combined aconitic acid and in particular from molasses (mother-liquors formed by removal of sugar by crystallization) produced in the manufacture of sugar from the juices of the sugarcane, and is an improvement in the process of extraction of aconitic acid disclosed in Patent No. 2,359,537, granted to Ventre, Ambler, Byall and Henry, said patent being an improvement in the process of Patent No. 2,280,085, granted to Ventre and Paine.

According to the disclosure of Patent No. 2,280,085, sorgo juice is centrifuged to remove the bulk of starch and the remaining juice is then treated with calcium hydroxide to raise the pH to about 8.4 to 8.6, heated and settled. The settlings are separated, thus removing more starch. The remaining clarified juice, which is substantially neutral, is then treated with an enzyme to hydrolyze remaining starch to sugar and the juice is evaporated to a sirup, heated to boiling and settled. The settlings, comprising principally calcium aconitate, are removed and sugar crystallized from the remaining sirup in regular manner.

In this process, it is necessary that the pH due to the added calcium hydroxide be kept quite low, since too high a concentration of the calcium hydroxide adversely affects the sirup for subsequent recovery of sugar. The recovery of aconitic acid is about 48 percent of that present in the original juice.

Patent No. 2,359,537 discloses an improvement in this process in that a water-soluble calcium salt, particularly calcium chloride, is added to the sorgo juice along with the calcium hydroxide. This supplies additional calcium ions, without, however, raising the pH above that due to the calcium hydroxide, and results in precipitation of a greater amount of aconitate, comprising principally calcium aconitate and some magnesium aconitate, when the sirup is heated to boiling, thus to increase the removal of the aconitic acid from the juice. This process results in the recovery of about from 80 to 85 percent of the total aconitic acid which is present in the original juice either as the free acid or combined acid.

It has now been found that the insoluble aconitate produced in the processes disclosed in the above-mentioned patents is not calcium aconitate in mechanical admixture with magnesium aconitate, but is a complex salt of aconitic acid (hereinafter referred to as complex calcium-magnesium aconitate). The crystals of this salt are characterized by the fact that a portion of the acidic groups of the trivalent aconitate radical contained in them is in chemical combination with magnesium while the remaining acidic groups are in chemical combination with calcium. These crystals are identities differing chemically and physically from both calcium aconitate and magnesium aconitate. The crystals vary in magnesium content, depending upon the concentration of magnesium ions in the molasses, between the limits represented by the chemical symbols $Ca_{2.75}Mg_{0.25}acon_2.6H_2O$ and $Ca_2MgAcon_2.6H_2O$, and are members of a series of mixed crystals or solid solutions of dicalcium magnesium aconitate hexahydrate, $$Ca_2MgAcon_2.6H_2O$$

and tricalcium aconitate hexahydrate, $$Ca_3Acon_2.6H_2O$$

These crystals are less soluble than tricalcium aconitate, and consequently the complex salt will separate from solutions containing appreciable amounts of magnesium ions in preference to the more soluble tricalcium aconitate.

In separating insoluble aconitate from plant juices according to the procedure for sorgo juices disclosed in U. S. Patent No. 2,280,085, the complex calcium-magnesium aconitate precipitates in an appreciable quantity upon evaporation of the juices, because such juices normally contain relatively large amounts of magnesium ions. Sugarcane juices, however, generally contain much smaller quantities of aconitic acid than sorgo juices, for which reason it is not possible to separate insoluble aconitate in any appreciable quantity from them by evaporating to a sirup.

Consequently, in manufacturing sugar from sugarcane juice, soluble aconitates in appreciable amounts remain in the molasses after removal of the sugar, and accumulate in the molasses in amounts which increase progressively with the number of crops or strikes of sugar crystallized, until a molasses may be obtained which has concentration of aconitates sufficiently great to allow the separation of some of the insoluble calcium-magnesium aconitate by crystallization. However, in the clarification processes in use in processing sugarcane juice for sugar, the amount of magnesium originally present in the juice is materially reduced, with the result that in the molasses usually there is not sufficient magnesium ions to form the desired insoluble calcium-magnesium complex. The amount of calcium ions in the molasses is also usually insufficient to react with all of the soluble aconitates present.

Correction of the deficiency of calcium ions by the addition of a solution of a soluble calcium salt to sorgo juice, preferably calcium chloride, is disclosed in U. S. Patent No. 2,359,537, but by this process the maximum separation of aconitic acid is not obtained because no provision is made for correcting the deficiency of magnesium ions in the molasses. We have found that in some cases the procedure disclosed in the last-named patent, when applied to sugarcane juice, results in only a scant precipitation of insoluble aconitate or in the precipitation at the higher temperature of a salt characterized by the property of being soluble at low temperatures and which, therefore, rapidly goes back into solution in the molasses when the temperature of the latter falls during the process of mechanically separating the precipitate from the molasses, or which rapidly dissolves while being washed with water to remove the adhering molasses. The resulting loss from one or both of these causes is very substantial, and may be a complete loss of the aconitate which is carried over with the molasses.

The objects of the present invention are to increase the quantity of aconitate which may be separated from sugarcane molasses over the quantity obtained according to the above-mentioned patents, and such other objects as will be apparent from a consideration of the following description and claims.

In general, according to the present invention, it has been found that to secure maximum precipitation of aconitate from sugarcane molasses, it is necessary to add not only a solution of a soluble calcium salt as disclosed in Patent No. 2,359,537, but also a solution of a soluble magnesium salt, particularly magnesium sulphate or, preferably the latter. The solution containing the magnesium salt should, for best results, be added either before the solution of the calcium salt is added or simultaneously with it, but not later. In case of the use of magnesium chloride, it is convenient to dissolve magnesium chloride and calcium chloride together in the same portion of water and add the solution to the molasses. If magnesium sulphate is used instead of the chloride, the solution of the magnesium sulphate must be thoroughly mixed into the diluted molasses before the solution of the calcium salt is added in order to prevent the precipitation of calcium sulphate. When both magnesium and calcium ions are thus supplied to the molasses, the aconitate which separates on heating to 180° to 210° F. is crystalline, and its solubility is but slightly altered by changes of temperature during the mechanical process of removing it from the molasses and of washing it free from adhering molasses. The treated molasses after the aconitate has been removed is in a condition suitable for further processing by usual sugarhouse procedures for the recovery of more sugar.

Since molasses is a mixture of indefinite and widely varying composition, the quantities of calcium hydroxide and of calcium and magnesium salts to be added to any particular molasses for maximum precipitation of the insoluble aconitate can be prescribed only after the relative proportions of calcium, magnesium and free and combined aconitic acid have been determined by chemical analyses. Sufficient calcium hydroxide is used to give the solution of the molasses a pH value of about from 6.0 to 7.0, more particularly of between 6.2 and 6.8. The quantities of calcium and magnesium salts to be used should for maximum recovery be in an amount sufficient to increase the calcium and magnesium ions in the mixture at least to the extent that the total quantity of calcium and magnesium ions present therein is sufficient to react and combine with all of the free and combined aconitic acid present in the original molasses to form the complex calcium-magnesium aconitate. This may be approximated by calculating the quantities needed to increase the calcium and magnesium contents of the original molasses sufficiently to combine with all of the free and combined aconitic acid in the molasses in the proportions of 23 parts of calcium and 7 parts of magnesium to every 100 parts of aconitic acid, corresponding to the empirical formula $Ca_2MgAcon_2$. An excess of calcium or magnesium salts is not objectionable for the precipitation of the aconitate, but any large excess increases unnecessarily the ash content of the treated molasses and is objectionable for the subsequent processing of the molasses for sugar. The actual optimum quantities of the salts are found by increasing or decreasing the calculated quantities until the proper proportions are obtained for maximum aconitate precipitation without increasing the ash content of the molasses to the extent that it becomes objectionable for sugarhouse processing. In making this calculation, the calcium hydroxide used in adjusting the pH of the diluted molasses may be ignored, since the amount is relatively small and a slight excess of calcium over the calculated amount is advantageous. This is because there is precipitated in the process considerable quantities of a highly hydrated amorphous, flocculent material containing much calcium and a little magnesium. The precipitation of this material therefore reduces the amounts of calcium and magnesium available for formation of the aconitate. Being of less density than the complex calcium-magnesium aconitate, this amorphous material can be separated from the aconitate by obvious mechanical means.

The following examples illustrate the process as applied to a molasses from which it was possible to separate only a very insignificant amount of an insoluble aconitate by the use of calcium hydroxide, calcium chloride and heat according to the procedures of the patents mentioned above. The molasses was a Louisiana B molasses from a mill manufacturing turbinado sugars and had the following composition pertinent to the process herein described: Brix solids, 80.3 percent; aconitic acid and soluble aconitates, as aconitic acid, 3.5 percent of Brix solids; calcium, 0.56 percent of Brix solids; magnesium, 0.20 percent of Brix solids. The amounts of both the calcium and the magnesium are insufficient to correspond to the formula $Ca_2MgAcon_2$ when combined with the aconitic acid and soluble aconitates present.

*Example I*

15 gallons of the B molasses mentioned above, containing 4.9 lbs. of free and combined aconitic acid, was diluted with 5 gallons of wash water from a previous batch and heated to 120° F.

Calcium hydroxide was made from 0.44 lb. of C. P. calcium oxide and 2 gallons of the same wash water and added and mixed with the diluted molasses, whereby the pH of the molasses mixture was raised to 6.1. A solution of 4.4 lbs. of commercial calcium chloride (75 percent actual $CaCl_2$) and 1.1 lb. of flake magnesium chloride (50 percent actual $MgCl_2$) in 3 gallons of the same wash water was added and thoroughly mixed by gentle agitation with the molasses mixture, giving a mixture of approximately 54 percent Brix solids. The temperature was rapidly raised to 205° F. and held between 195° and 205° F. for 45 minutes, resulting in precipitation of complex calcium-magnesium aconitate. The precipitate was separated from the diluted molasses on a 14-inch solid basket centrifuge at 1500 R. P. M. The molasses discharged was suitable for further working in the sugarhouse. The cake of separated precipitate was suspended in 10 gallons of hot water and the resulting slurry was centrifuged as before. The discharged wash water was used in diluting the molasses and preparing the necessary solutions for the next batch, thus conserving both the sugar and aconitate removed in the washing process. The cake of washed precipitate was dried at 165° to 170° F. It weighed 3.2 lbs. and contained by analysis 58 percent aconitic acid, which corresponds to a recovery of 37.9 percent of the aconitic acid contained in the original molasses.

The aconitic acid balance, calculated to the nearest 0.1 lb. was found to be as follows: Input: 4.9 lbs. in molasses plus 0.4 lb. in wash water added; total input, 5.3 lbs. Output: 3.0 lbs. in treated molasses plus 0.4 lb. in wash water plus 1.9 lbs. in aconitates; total output, 5.3 lbs.

*Example II*

30 gallons of the B molasses was diluted with 10 gallons of the wash water from a previous batch and calcium hydroxide prepared from 14 oz. of C. P. calcium oxide suspended in 4 gallons of the same wash water was added to the diluted molasses. After thorough mixing at 120° F., the pH of the mixture was 6.8. A solution of 8 lbs., 13 oz. of commercial calcium chloride (75 percent actual $CaCl_2$) and 4 lbs. 6½ oz. of flake magnesium chloride (50 percent actual $MgCl_2$) in 6 gallons of the same wash water was added with gentle agitation to the molasses mixture, producing a mixture of approximately 55 percent Brix solids. Gentle agitation was continued while the temperature of the mixture was raised rapidly to 200° to 210° F. and held within this range for 45 minutes, thus to precipitate the complex calcium-magnesium aconitate. The precipitate was collected on a 14-inch solid basket centrifuge at 1500 R. P. M. The molasses discharged was suitable for further sugarhouse processing. The cake of separated precipitate was suspended in 20 gallons of hot water, and the resulting slurry was centrifuged as before. The cake of washed precipitate, dried at 165° to 170° F., weighed 9 lbs. The wash water discharged from the centrifuge was used for diluting the molasses and preparing the solutions for the succeeding batch, thus conserving both the sugar and aconitate removed in the washing process.

The total aconitate obtained from 210 gallons of molasses, processed as described above in seven consecutive batches, weighed 56.8 lbs., and when composited, assayed 56.0 percent aconitic acid, which corresponds to a recovery of 46 percent of the aconitic acid contained in the original molasses.

Having thus described the invention, what is claimed is:

1. A process of separating aconitic acid from sugarcane molasses containing free and combined aconitic acid, comprising adding calcium hydroxide to the molasses to produce a mixture having a pH from 6.0 to 7.0, adding calcium chloride and a magnesium salt selected from the group consisting of magnesium chloride and magnesium sulphate to the molasses in an amount sufficient to increase the calcium and magnesium ions in the mixture at least to the extent that the total quantity of calcium and magnesium ions present therein is sufficient to react and combine with all the free and combined aconitic acid present in the original molasses to form complex calcium-magnesium aconitate, in case the magnesium salt is magnesium chloride it being added not later than addition of the calcium chloride, and in case the magnesium salt is magnesium sulphate it being added before addition of the calcium chloride, and heating the resulting mixture to precipitate the formed insoluble complex calcium-magnesium aconitate.

2. The process of claim 1, wherein the magnesium salt is magnesium chloride and is added simultaneously with addition of the calcium chloride by forming a solution of it and the calcium chloride in water and adding the solution to the molasses.

JOSEPH A. AMBLER.
EARL J. ROBERTS.

REFERENCES CITED

The following references are of record in the file of this patent:

UNITED STATES PATENTS

| Number | Name | Date |
|---|---|---|
| 2,280,085 | Ventre et al. | Apr. 21, 1942 |
| 2,359,537 | Ventre et al. | Oct. 3, 1944 |

OTHER REFERENCES

Ambler et al., Journ. of Amer. Chem. Soc., vol. 67, pages 1–4, Jan. 8, 1945, "Some Salts of Aconitic Acid."